US008620624B2

(12) United States Patent
Skibiski et al.

(10) Patent No.: US 8,620,624 B2

(45) Date of Patent: Dec. 31, 2013

(54) EVENT IDENTIFICATION IN SENSOR ANALYTICS

(75) Inventors: Greg Skibiski, New York, NY (US); Alex (Sandy) Pentland, Lexington, MA (US); Tony Jebara, New York, NY (US); Christine Lemke, New York, NY (US); Markus Loecher, Princeton Junction, NJ (US); Girish Rao, New York, NY (US); Jason Uechi, Montclair, NJ (US); Blake Shaw, New York, NY (US); Joseph Mattiello, New York, NY (US); David Rosenberg, Scotch Plains, NJ (US)

(73) Assignee: Sense Networks, Inc., New York, NY (US)

( * ) Notice: Subject to any disclaimer, the term of this patent is extended or adjusted under 35 U.S.C. 154(b) by 920 days.

(21) Appl. No.: 12/241,266

(22) Filed: Sep. 30, 2008

(65) Prior Publication Data

US 2010/0082301 A1 Apr. 1, 2010

(51) Int. Cl.
*G06F 11/00* (2006.01)

(52) U.S. Cl.
USPC .......... 702/188

(58) Field of Classification Search
USPC .......... 702/188
See application file for complete search history.

(56) References Cited

U.S. PATENT DOCUMENTS

| | | | | |
|---|---|---|---|---|
| 6,038,559 | A | 3/2000 | Ashby et al. | |
| 6,704,787 | B1 | 3/2004 | Umbreit | |
| 7,143,083 | B2 * | 11/2006 | Carlbom et al. | 1/1 |
| 7,292,963 | B2 | 11/2007 | Bornhoevd et al. | |
| 2001/0029506 | A1 | 10/2001 | Lee et al. | |
| 2001/0036224 | A1 | 11/2001 | Demello et al. | |
| 2001/0049636 | A1 | 12/2001 | Hudda et al. | |
| 2002/0111852 | A1 | 8/2002 | Levine | |
| 2004/0117358 | A1 | 6/2004 | von Kaenel et al. | |
| 2005/0099322 | A1 * | 5/2005 | Wainfan et al. | 340/995.13 |
| 2005/0143909 | A1 | 6/2005 | Orwant | |
| 2006/0074883 | A1 | 4/2006 | Teevan et al. | |
| 2006/0085177 | A1 | 4/2006 | Toyama | |
| 2006/0167634 | A1 * | 7/2006 | Cho et al. | 702/5 |
| 2006/0223505 | A1 | 10/2006 | Starr et al. | |
| 2008/0005674 | A1 | 1/2008 | Wattenberg et al. | |
| 2008/0082472 | A1 | 4/2008 | Dalton | |
| 2008/0188261 | A1 | 8/2008 | Arnone | |

OTHER PUBLICATIONS

Neill, Daniel B., et al., "Anomalous Spatial Cluster Detection," Proceedings of the KDD 2005 Workshop on Data Mining Methods for Anomaly Detection.

(Continued)

*Primary Examiner* — Janet Suglo

(74) *Attorney, Agent, or Firm* — Kaplan Breyer Schwarz & Ottesen, LLP

(57) ABSTRACT

A method of detecting an event anomaly includes receiving one or more data points, in which each data point represents a spatial or temporal event; associating a unique identifier with each of the one or more data points to obtain one or more individualized data points; distributing the one or more individualized data points across a grid, in which the grid includes one or more cells; determining an event likelihood ratio for one or more of the grid cells; identifying one or more event clusters, in which each event cluster includes one or more of the grid cells; and storing in a data repository an event cluster having a significance level above a threshold significance level.

48 Claims, 9 Drawing Sheets

Receive one or more spatial or temporal data points 300

Associate each data point with an unique identifier to obtain individualized data points 302

Distribute individualized data points across a grid 304

Determine event likelihood ratio for each cell in grid 306

Detect one or more event clusters having a maximum likelihood ratio 308

Store in a data depository event clusters having a value above a specified threshold value 310

(56) References Cited

OTHER PUBLICATIONS

Non-Final Office Action mailed on Sep. 27, 2010 in co-pending U.S. Appl. No. 12/134,634.

Donoho, David, et al., "Higher Criticism for Detecting Sparse Heterogeneous Mixtures," *The Annals of Statistics*, 32(3):962-994 (2004).

Kulldorff, Martin, "A Spatial Scan Statistic," *Communications in Statistics—Theory and Methods*, 26(6): 1481-1496 (1997).

Kulldorff, Martin, "Prospective time-periodic geographical disease surveillance using a scan statistic," *Journal of the Royal Statistical Society*, A164:61-72 (2001).

Kulldorff, Martin, "Spatial Disease Clusters: Detection and Inference," *Statistics in Medicine* 4:799-810 (1995).

Loh, Ji Meng, et al., "Accounting for Spatial Correlation in the Scan Statistic," manuscript, also published in *Annals of Applied. Statistics* 1(2): 560-584 (2007).

Neill, Daniel B., "Detection of Spatial and Spatio-Temporal Clusters," (Ph.D. thesis, Carnegie Mellon University) (2006).

Rogerson, Peter A., "Monitoring Point Patterns for the Development of Space-Time Clusters," *Journal of the Royal Statistical Society. Series A* (*Statistics in Society*), 164(1):87-96 (2001).

International Search Report mailed in PCT/US2009/058782 on Apr. 26, 2010.

International Search Report mailed in PCT/US2009/058768 on May 17, 2010.

* cited by examiner

EVENT IDENTIFICATION IN SENSOR ANALYTICS

FIELD OF THE INVENTION

The present invention generally relates to systems and methods for identifying events, event groupings and event clusters in sensor analytics.

BACKGROUND

An event anomaly is the occurrence of one or more events or activities that deviate from a historical or other specified norm. Detection of an anomaly can entail collecting information and data related to the occurrence of the one or more events and then sorting through the collected information to identify anomalous behavior. Both spatial and temporal data can be used to track and identify hotspots, outbreaks and clusters of elevated or depleted event activity.

SUMMARY

The present invention generally relates to systems and methods for identifying events, event groupings and event clusters in sensor analytics. In general, one aspect of the subject matter described in this specification can be embodied in a computer-implemented method of detecting an event anomaly that includes receiving one or more data points, in which each data point represents a spatial or temporal event; associating a unique identifier with each of the one or more data points to obtain one or more individualized data points; distributing the one or more individualized data points across a grid, wherein the grid includes one or more cells; determining an event likelihood ratio for one or more of the grid cells; identifying one or more event clusters, in which each event cluster includes one or more of the grid cells; and storing in a data repository an event cluster having a risk level above a threshold risk level.

In another aspect, a system can include means for distributing one or more event data points across a grid having a plurality of cells; means for refining the grid shape based on the one or more event data points; and means for detecting an event anomaly over one or more cells of the grid.

In yet another aspect, a system can include means for distributing one or more event data points across a grid having a plurality of cells; means for refining the grid shape based on the one or more event data points; and means for detecting an onset of an event anomaly over one or more cells of the grid.

In another aspect, a computer-implemented method of detecting an event anomaly includes receiving one or more data points, in which each data point represents a spatial or temporal event; associating a unique identifier with each of the one or more data points to obtain one or more individualized data points; distributing the one or more individualized data points across a first region, in which the first region represents a spatial region, a temporal region, or a space-time region; determining an event likelihood ratio for one or more second regions, wherein each of the one or more second regions is a subset of the first region; identifying a second region having a maximum likelihood ratio as an event cluster; and storing the event cluster in a data repository. Other embodiments of these aspects include corresponding systems, apparatus, and computer program products (a computer program product, encoded on a computer-readable medium, operable to cause data processing apparatus to perform operations of the method).

These and other embodiments can optionally include one or more of the following features. The one or more data points can be received from a mobile device, a location enabled device, or a data provider or data aggregator.

In some implementations, the one or more data points can be received in real time. Alternatively, or in addition, the one or more data points can be received according to a predetermined schedule. In some circumstances, the unique identifier includes a location identifier, a time identifier, an event type identifier, or is associated with an individual user.

In certain cases, the unique identifier includes a demographic attribute. The demographic attribute may be selected from the group consisting of Census Bureau data, financial demographics, social demographics, historical demographic information, derived demographic information, gender, race, educational level, historical geographic information and user entered information.

In some implementations, the grid may be a spatial grid. The method can further include partitioning the spatial grid based on a density of the individualized data points over a specified area. Alternatively, or in addition, the method may include partitioning the spatial grid according to a predefined geographic layout.

In some cases, the grid is a space-time grid. In certain circumstances, the method may include partitioning the space-time grid based on a frequency of occurrence of the individualized data points over a specified time interval. The method may include partitioning the space-time grid based on a density of individualized data points over a specified area.

In some implementations, determining the event likelihood ratio includes determining a number of individualized data points for each cell. Determining the event likelihood ratio can include determining an expected number of individualized data points for each cell, in which the expected number of individualized data points is based on a time duration of historical events in each respective cell. Determining the event likelihood ratio can include determining an expected number of individualized data points based on an historical dataset in each respective cell. Determining the expected number of individualized data points may include adjusting an historical dataset for each cell based on one or more covariate parameters.

The one or more covariate parameters can include a weather event or is selected from the group consisting of a holiday event, a time of the day, a time of the week, a time of the month, and a time of the year.

In some cases, identifying one or more event clusters includes calculating a total event likelihood ratio for one or more grid cells or scanning the grid for a group of one or more cells having a maximum event likelihood ratio. The scanning can be across a spatial region of the grid. The scanning can occur over an interval in time. The scanning can occur over an interval in space-time.

In certain implementations, the method may include exporting one or more identified event clusters to a display. The one or more exported event clusters can be non-overlapping. In some cases, an identified event cluster having a center in a previously exported event cluster can be excluded from the display. Alternatively, or in addition, an identified event cluster having a center located in the center of a previously exported event cluster is excluded from the display. In some implementations, an event cluster corresponding to each cell of the grid is exported to the display.

The method may also include refining a grid partition based on a size of one or more event clusters and/or annotating the event clusters with demographic information. The threshold risk level can be user-defined and/or based on a size of the one or more event clusters. In some cases, the method may include determining a center of at least one of the one or more clusters having a relative risk greater than the specified threshold.

In some implementations, each of the one or more second regions includes a minimum of two individualized data points.

Event anomaly detection may be used to analyze spatial and temporal scan statistics for various applications and scientific fields including, but not limited to, social activity analysis, business intelligence collection, sales-competition analysis, marketing, transportation analysis and logistics, traffic monitoring, remote sensing, economic analysis, epidemiology, biosurveillance, environmental monitoring, government emergency services, ecology, and other fields where the occurrence or dispersion of an anomalous event can have impacts on behavior, planning, operations, or forecasting. Event anomaly detection can be used to provide real-time identification of anomalous behavior as well as identification of the onset or offset of anomalous behavior. Event anomaly detection can be used to find the center of anomaly clusters. Event anomaly detection can be used to notify members of groups when anomalous activities are occurring.

The details of one or more embodiments of the invention are set forth in the accompanying drawings and the description below. Other features of the invention will be apparent from the description and drawings, and from the claims.

DETAILED DESCRIPTION

In an exemplary implementation described below, event anomaly detection can be applied to location-based services. Location-based sensory analytics is described in issued U.S. Pat. No. 8,224,766, entitled "Comparing Spatial-Temporal Trails in Location Analytics," filed Sep. 30, 2008, the contents of which are incorporated by reference in their entirety. By way of example, and without limitation, event anomaly detection can be applied to location-based sensory analysis, wherein clusters of individuals sharing common characteristics, demographics or affiliation are determined with regard to specific geographic areas and/or over specific periods of time.

Figure 1:
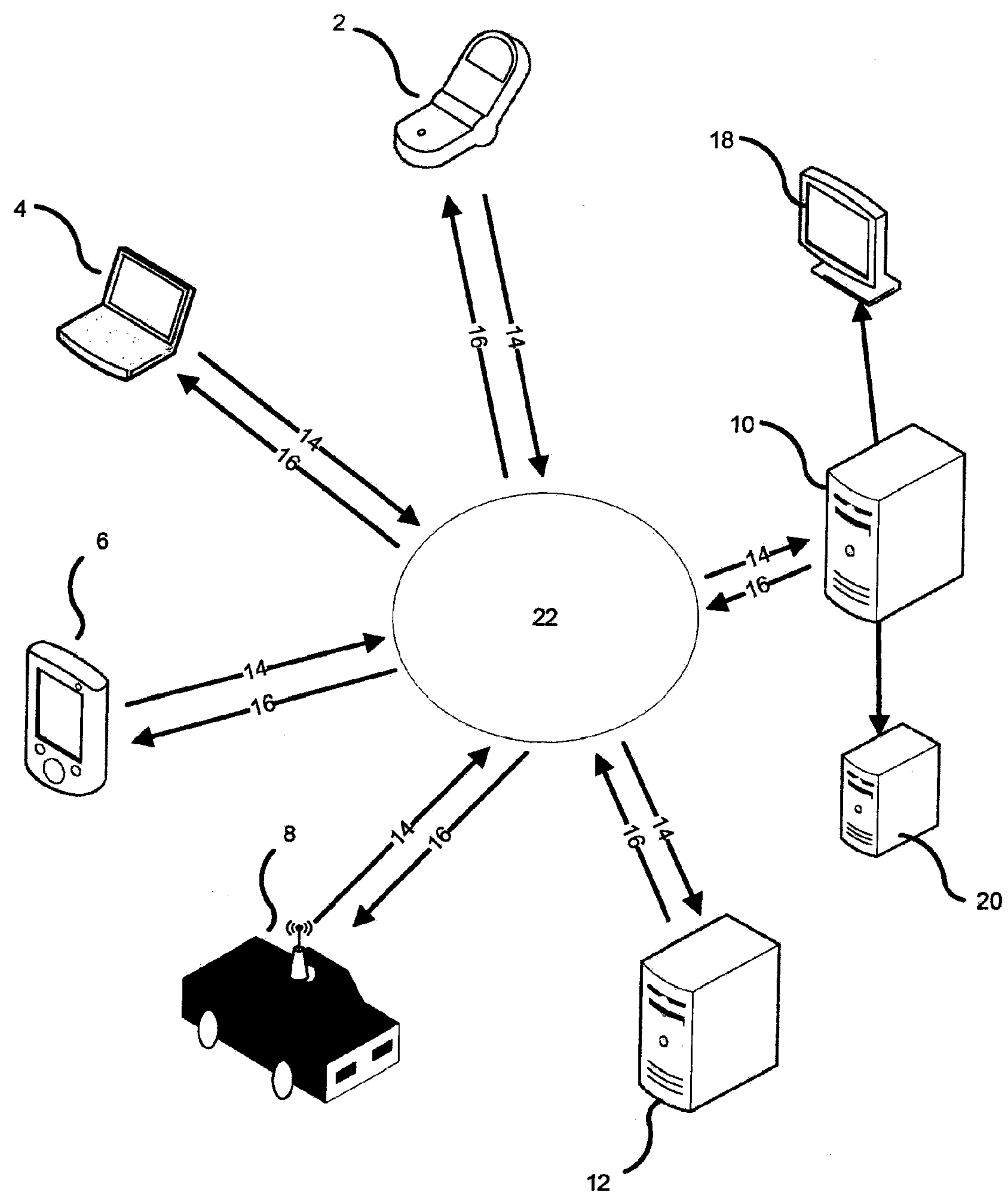
FIG. 1 shows an example of a system used to detect an event anomaly.

FIG. 1 shows an example of a system 1 used to detect an event anomaly. The system 1 includes one or more user devices connected to a network 22 for sending data to (14) or receiving data from (16) an application server 10. The user devices include, but are not limited to, electronic devices such as a cell phone 2, computer 4, personal digital assistant 6, or a global positioning system (GPS) enabled device 8. In some cases, the user devices also can include a database server 12. The user devices may include one or more program applications that are designed to interact with the application server 10.

In operation, the application server 10 receives, via the network 22, spatial and/or temporal data from one or more of the user devices. The application server 10 then analyzes the received data and determines whether a spatial, temporal or combined space-time event anomaly exists. When searching for deviations from normal activity or behavior, the received information can be adjusted based on historical data. Moreover, demographic information can be associated with the received data and/or detected anomalies to provide enhanced event analysis. The server 10 may send the results of the analysis back to the user devices for display, store the results in a data repository 20, or export the results to a display 18 separate from the user devices. The data repository 20 may be located in a component separate from the application server 10 or may be part of the application server memory.

The data sent to the application server 10 may include information relating to one or more particular events, users or devices at a certain time and/or location. An "event" can include any activity or occurrence which can be identified by the location and/or time at which it occurs. For example, an event may represent the arrival or departure of a person(s), animal(s), or product(s) to and/or from a specific geographic location, such as a place of employment, a transit terminal, a food store, a landmark, a shopping center, a hospital, a residence, a street, town, city, state, country, or any location identified by a GPS enabled device. Other geographic locations may be identified as well. In some implementations, the event can correspond to one or more environmental changes, such as a change in weather or temperature. In some cases, the event may correspond to a user activity, such as placing a phone call or purchasing an item either in person or through a network connected device. The event may correspond to public events or entertainment such as speeches, games, movies, dance shows, musicals, or sales promotions. In some implementations, the event may correspond to a change in patterns, such as the onset of a traffic jam. In some circumstances, the event may correspond to an electronic device based activity, such as the startup of computer program application or login activity. Other electronic device based activity may be identified as well.

In some cases, the data received in the application server 10 can include data sent from a cell-based communication device such as the location of a particular cell phone with a cellular network at a particular time. In some implementations, the data received in the application server 10 can include GPS location and time data sent from a GPS enabled device 8, such as a GPS enabled cell phone, navigational device, or laptop computer. Other GPS enabled devices may be used as well. Alternatively, or in addition, the data may include user information, such as a user ID or an account ID associated with a particular device. In some implementations, the data received by the application server 10 can be sent by a passive location-based service such as an automated teller machine (ATM), which gives the time and/or location of a unique user. This also can include RFID enabled devices such as RFID tags used for toll collection services, proximity cards, product and inventory tracking, and animal tracking and identification. Moreover, the data can include information that relates to the user device from which it is being sent, such as whether the device is a cell phone, laptop, personal digital assistant or GPS enabled device.

The data may be sent to the application server 10 in real-time as an event or activity occurs. For example, an RFID enabled system may pass location and time data in real-time to the application server 10 when the RFID enabled system is triggered by an RFID tag, such as those included in automobiles or proximity cards. Alternatively, or in addition, data may be sent from a data provider or data aggregator. The data provider or data collector can collect the event data points over a specified period prior to sending them to the application server 10. For example, database 12 may store, over a specified time period, data that represents the occurrence of one or more particular events that occur on a computing platform, such as operating system startup, user login, or an application specific activity. The stored data then may be sent to the application server 10 periodically according to a predetermined schedule or at user-specified times.

In some implementations, the data sent to the application server 10 can include demographic information associated with the time and/or place of the event or activity. The demographic information can identify, for example, the average income, age, and educational level of residents living in the region or neighborhood in which the activity or event takes place. The demographic information also may include the consumer trends and profiles associated with individuals who have previously been at the location where the event occurs. The demographic information may be based on locations previously visited by the user device or a user associated with the user device. Other demographic information includes, but is not limited to, Census Bureau data, gender, religion, ethnicity, national or regional origin, employment, occupation, vocation, career, hobby interest, marital status, sexual orientation, consumer preferences, consumer habits, or organizational memberships and participation.

Figure 2:
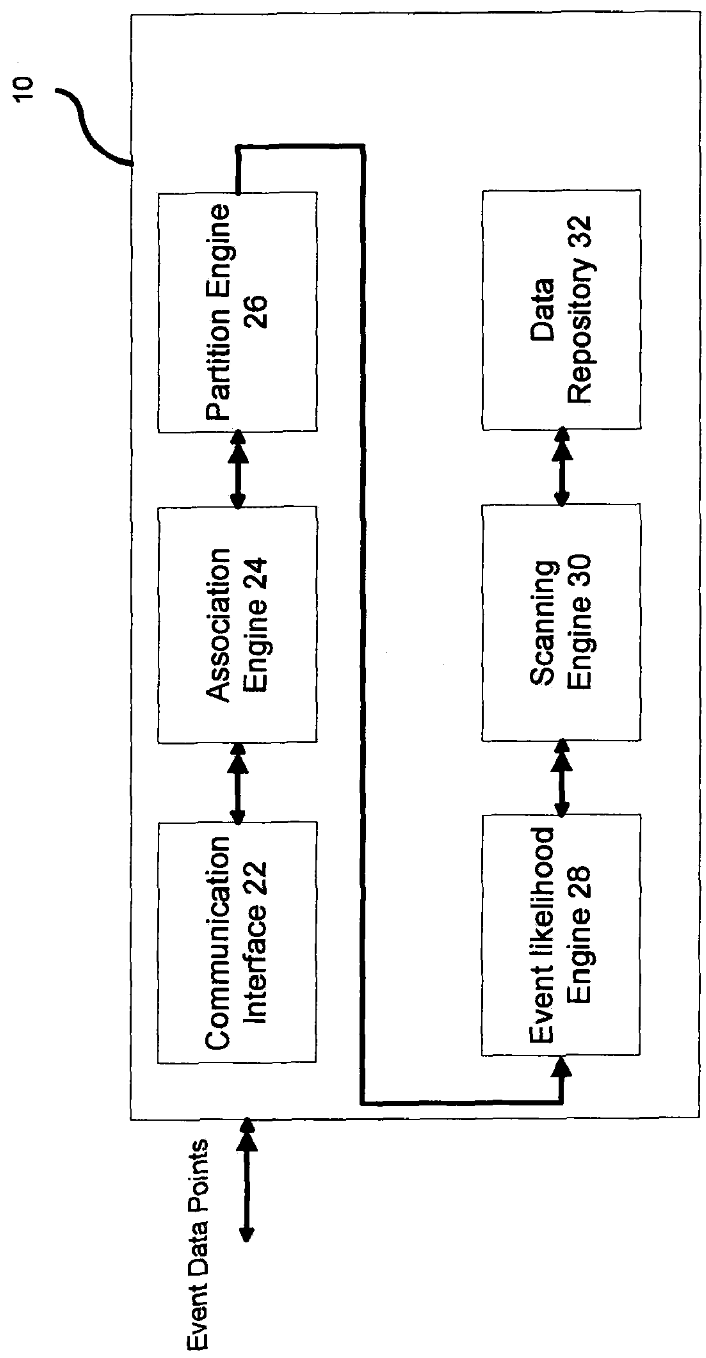
FIG. 2 shows an example of an application server used to analyze event data received from user devices.
Figure 3:
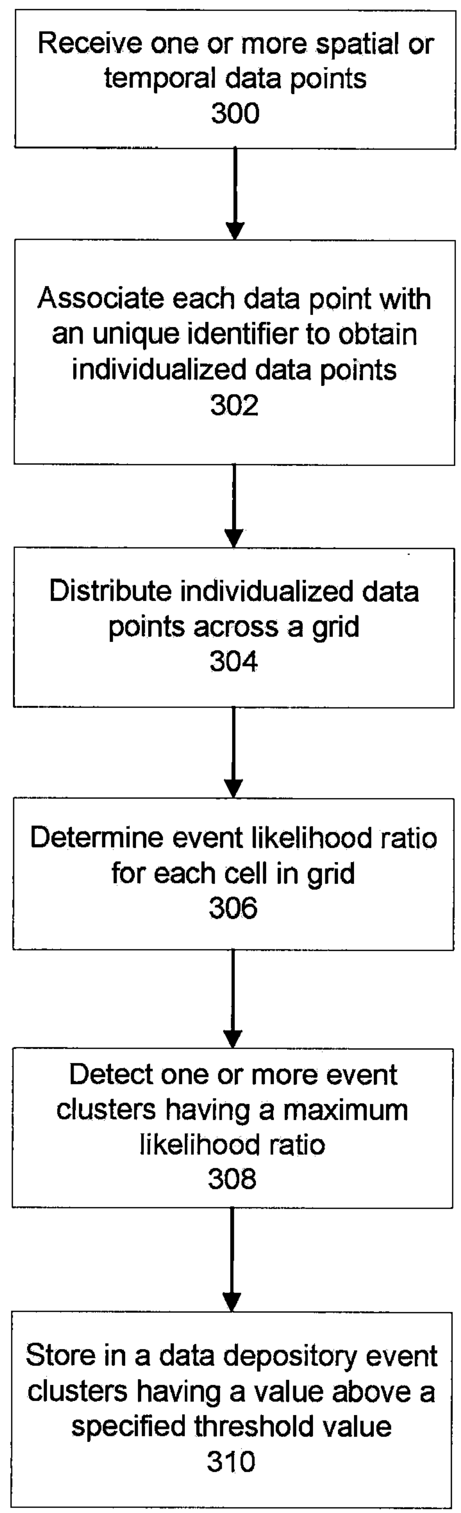
FIG. 3 shows a method of detecting an event anomaly based on received event data.

FIG. 2 shows an example of an application server 10 used to analyze event data received from user devices. FIG. 3 shows a method of detecting an event anomaly based on the received event data. The event data may be sent to the application server 10 as a single event data point or as a collection of event data points. The application server 10 is not limited to a single machine and may include multiple interconnected machines, each having one or more processors and databases.

In one implementation, communication into or out of the application server 10 is made via input/output of communication interface 22 which is coupled to a network such as the Internet or a local area network or both. The communication interface 22 receives (300) one or more event data points from a user device, in which an event data point represents a spatial and/or temporal event. Communication interface 22 is a conventional communication interface that supports Ethernet, TCP/IP and/or other conventional communication protocols. Communications may be made over the Internet or another network via communication interface 22.

The event data points then are passed by the communication interface 22 to an association engine 24. The association engine 24 associates (302) a unique identifier to each event data point that is received by the application server 10 to obtain one or more individualized data points. Based on the information contained within the event data point, the unique identifier may correspond to a time stamp specifying a time the event occurred, a location stamp specifying a location of where the event occurred, a user stamp identifying the particular user to which the event corresponds, or a device stamp identifying a particular device from which the event data is received. For example, a unique identifier can be a location enabled device, such as a cellular telephone, a GPS enabled device, a networked device, a WiFi enabled device, an RFID enabled device, an ATM, or any other device that identifies a time/location data point. In some cases, the association engine 24 may associate demographic profiles or other demographic information to the event data points based on the received time/location data. In some cases, the demographic profiles/information assigned to the event data points may be based on locations to which the unique identifier has previously traveled. Alternatively, or in addition, the demographic profiles/information may be based on a historical record of the particular geographic location.

The individualized data points then are passed to a partition engine 26. The partition engine 26 arranges a grid or mapping that includes one or more individual cells. The mapping can be applied across a geographic or spatial area, a specified time period, or space-time. The partition engine 26 then distributes (304) the one or more individualized data points across the cells of the grid based on location and/or time information associated with the each data point.

An event likelihood engine 28 then analyzes the grid-based data to determine (306) an event likelihood ratio for each grid cell. The event likelihood ratio represents a comparison of the actual number of events occurring in a grid cell or group of grid cells relative to a number of events that is expected to occur in that same cell or group of cells. Accordingly, the likelihood ratio provides an indication of how likely an event is to occur. A scanning engine 30 then scans across the entire grid to identify (308) individual cells as well as interconnected groups of cells, i.e., event clusters, that have a likelihood ratio greater than an expected value. The clusters with elevated likelihood ratios are thus more likely to correspond to an event anomaly. In some cases, however, clusters with elevated likelihood ratios are due to chance and do not represent an event anomaly. To isolate the event clusters that are not a result of chance, the scanning engine performs a significance analysis of the cluster data to determine how often clusters having the specified likelihood ratios should occur. The significance analysis can be performed using Monte Carlo randomization or Bayesian techniques. The event clusters having a level of significance above a threshold value are stored (310), in a data repository 32.

Figure 4A:
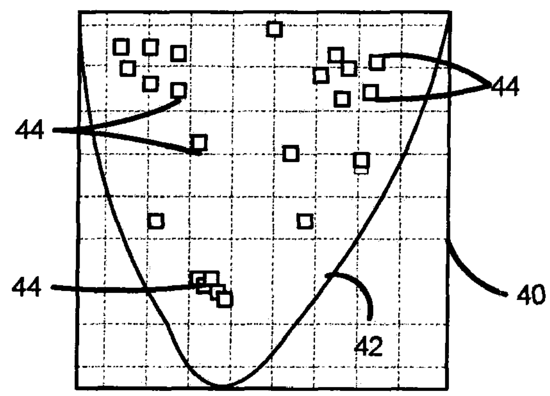
FIG. 4A shows an example of a spatial grid.

As explained above, the event data points are collected in application server 10 from user devices such as automobiles, mobile phones, computers, personal digital assistants and GPS enabled devices, among others. The event data points then are associated with unique identifiers by the association engine 24. For spatial data that represents where one or more events occur, the individualized data points can be distributed across a cell-based spatial grid by the partition engine 26. Such a grid can be a regular rectangular partition, a Voronoi tiling based upon data point density, or correspond to natural geographic entities such as countries, provinces, counties, cities, parishes, census tracts, postal code areas, school districts, and households, among others. FIG. 4A shows an example of a spatial grid 40. The grid is rectangular partitioned and applied to a geographical region 42 (e.g., City X) over which individualized data points 44 have been distributed. In the example shown in FIG. 4A, the boundaries of the geographic region 42 may correspond to a border between land and water or, alternatively, to a border between towns, states or countries.

Figure 4B:
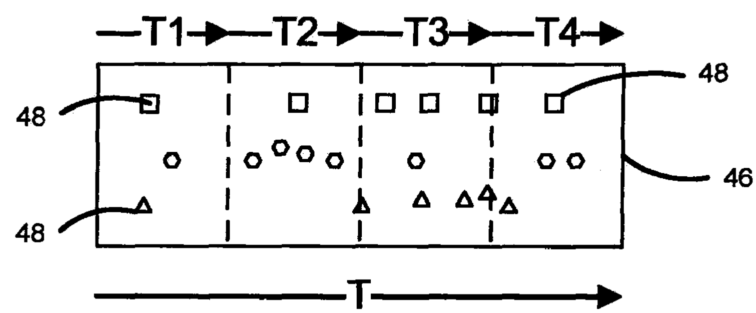
FIG. 4B shows an example of a temporal grid.

Similarly, in the case of temporal data that represents the timing of one or more events, the individualized data points can be distributed across a cell-based temporal grid. The cells of the temporal grid can be partitioned according to years, months, weeks, days, hours, or minutes. Other temporal partitioning of the grid may be applied as well. FIG. 4B shows an example of a temporal grid 46. The grid 46 is partitioned into multiple time periods (T1, T2, T3, T4) across a time span T over which individualized data points 48 have been distributed. In some implementations, the individualized data points are representative of both the spatial and temporal aspects of an event. In those cases, the data points may be distributed across cells of a combined grid, which can be partitioned in both the spatial and temporal extent. In some cases, the grid can be adaptive such that cell size and location adjusts based on the number and density of received individualized data points.

Figure 4C:
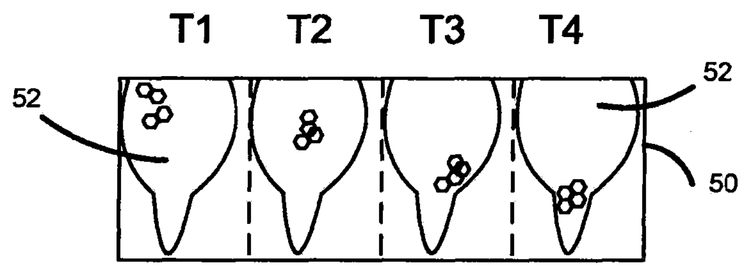
FIG. 4C shows an example of a combined spatial-temporal grid.

FIG. 4C shows an example of a combined spatial/temporal grid 50. The grid 50 includes a partitioned geographic location 52 that is captured at multiple time periods (T1, T2, T3, T4). At each time period, the individualized data points 54 may be found at different locations within the geographic location 52. Accordingly, anomalous events may be tracked over time and space.

Once the individualized data points have been distributed to the grid cells, the event likelihood engine 28 calculates the likelihood of the individualized data points occurring over different sized spatial and/or temporal regions S. Each spatial/temporal region S thus can be identified according to a likelihood ratio LR(S). Those regions with a high likelihood ratio are more likely to correspond to an anomalous event, i.e., they are the regions less likely to occur due to chance or variance in the data points. Those regions with a low likelihood ratio are less likely to correspond to an anomalous event, i.e., they are the regions that are more likely to occur due to chance. The likelihood ratio LR(S) may be based on a relative risk value Q for each region S, where Q represents the actual number of individualized data points located in the region S relative to a number of individualized data points expected to occur in the that region. The size of region S can range from a single grid cell to all of the grid cells within the grid. The likelihood ratio LR(S) can be computed for a set of regions having a shape and size that a user is interested in detecting. Alternatively, or in addition, the application server 10 may be pre-programmed to analyze regions having a particular shape and size. The event likelihood engine 28 calculates LR(S) for each different region S. The likelihood ratio LR(S) may be calculated using a Poisson distribution or a negative binomial (NB) distribution. Modeling the data with a NB distribution may help reduce the effect of over-dispersion that otherwise occurs with count data that are not modeled well by a Poisson distribution (i.e., data that show significant over-dispersion). Accordingly, the application of the NB-to-Poisson transformation may reduce the number of spatial/temporal regions S identified with high likelihood ratios, thus reducing detection of false event anomalies.

The expected number of individualized data points may be based on a historical dataset for a particular grid cell or region S. The historical dataset can contain individualized data points, each of which have been previously recorded for a particular spatial location and/or time. The historical dataset can be stored in memory within the application server 10 or obtained from a source external to the server. In some implementations, the application server 10 updates the historical values based on received individualized data points. Using the historical dataset allows the application server 10 to calculate a likelihood ratio LR(S) that can be adjusted for multiple covariate parameters. For example, the historical dataset may be used to determine a likelihood ratio that is adjusted for covariates including, but not limited to, holidays, seasons, time of year, time of day, weather conditions, extraordinary events (such as sporting events or catastrophes) or demographic. In some cases, the extraordinary events can be removed from the historical dataset so the dataset is more representative of “normal” historical behavior.

After computing the expected counts for each grid cell—based on the historical data—the scanning engine 30 scans across the grid to detect regions having an elevated likelihood ratio, i.e., event clusters. To detect the event clusters, the scanning engine 30 may use multiple different size and shape scanning windows. For example, when scanning spatial regions, the scanning engine 30 may use a scanning window that is shaped like a circle, ellipse, square or rectangle. Other scanning window shapes may be used as well. When scanning temporal regions, the scanning engine 30 may use a specified interval in time. For example, the scanning interval can be in seconds, minutes, hours, days, weeks, months or years. When scanning combined spatial-temporal regions, the scanning engine 30 may use cylindrical windows having a circular or elliptical base or cubic windows having a square or rectangular base. Other three-dimensional scanning windows may be used as well. In some cases, the user may specify the scanning window size or shape. The scanning engine 30 then seeks to identify the region that is the most likely anomalous, i.e., the event cluster that is least likely due to chance. The most likely event cluster is represented by the region having the maximum likelihood ratio, $LR(S)_{max}$.

However, the event cluster having the maximum likelihood ratio may still have occurred as a result of fluctuations in the individualized data points. To enhance confidence that the selected event cluster is anomalous, the scanning engine 30 applies a statistical significance test. That is to say, the scanning engine 30 applies a computational algorithm of repeated random sampling, such as the Monte-Carlo method, to determine the statistical significance of the selected event cluster. Merely computing a separate significance score, p[F(S)], for each region could result in a large number of false positives (proportional to the number of regions searched) due to the multiple hypothesis testing problem.

Instead, a large number of “replicas” may be generated under a null hypothesis, in which the null hypothesis represents a baseline value determined from a historical dataset. In this approach (which may be based on a Monte Carlo analysis) each replica is a copy of the original observation region S and is assigned the expected or baseline value. The replicas are not, however, populated with the individualized data points received from the user devices. Instead, the replicas are populated with values obtained randomly from a Poisson or negative binomial distribution with a mean and variance from the null distribution (i.e., the historical dataset). A maximum score for each replica, $F(S)_{max}=\max\{F(S)\}$, then is computed. The statistical significance of any region S then can be determined by calculating a ratio of the number of replicas having $F(S)_{max}$ greater than the maximum likelihood ratio found in the original data.

Figure 5:
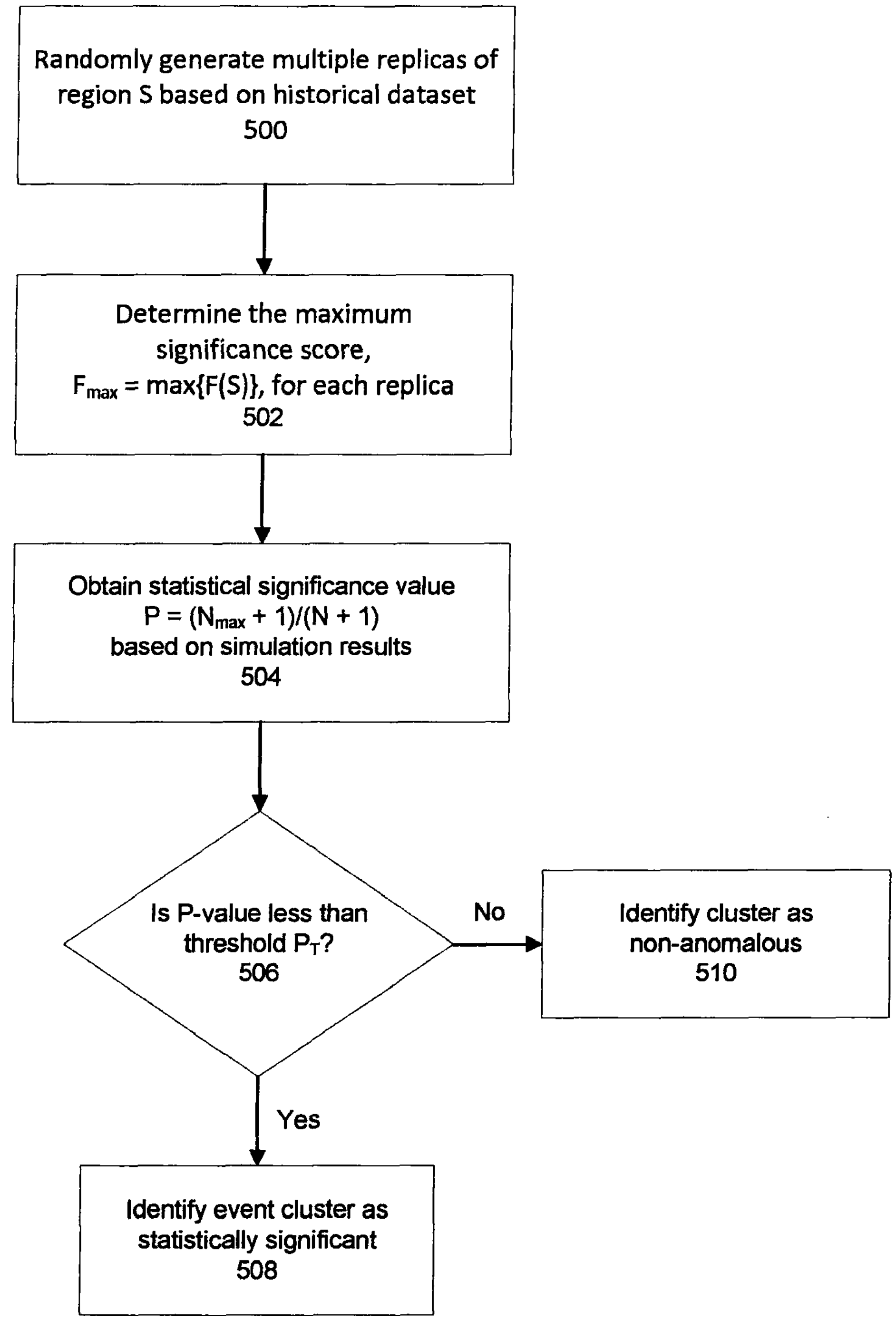
FIG. 5 shows a method of applying a computational algorithm to determine a statistical significance of an event cluster.

FIG. 5 shows a method of applying the computational algorithm to determine the statistical significance of an event cluster. The scanning engine 30 randomly generates (500) a large number of “replicas” using the baseline value determined from a historical dataset. Any number of replica simulations can be run by the scanning engine 30 to determine the statistical significance of the potential event cluster. For example, the scanning engine 30 can run 100 simulations, 200 simulations, 1000 simulations, 5,000 simulation, or 10,000 simulations. The scanning engine 30 then computes (502) the maximum significance score $F(S)_{max}=\max\{F(S)\}$ of each replica.

Once the maximum significance score for each replica is obtained, the scanning engine 30 obtains (504) a statistical significance value P for each potential cluster based on the results of the simulations. The P-value corresponds to a ratio of the number of simulations that result in a maximum significance score greater than the likelihood ratio found from the original data relative to the total number of replica simulations run by the scanning engine 30. In some cases, P may be given as: $P=(N_{max}+1)/(N+1)$, where $N_{max}$ is the number of replicas having a maximum significance score and N is the total number of replicas that were simulated. For example, a P-value of approximately 0.1 may correspond to 100 simulations for which a likelihood ratio greater than $F(S)_{max}$ is observed out of 1,000 total replica simulations.

The scanning engine 30 then compares (506) the calculated P-value to a threshold statistical significance value $P_T$. If the calculated P-value is less than the threshold value, the event cluster is identified (508) as an anomalous event and is stored in a data repository associated with the application server 10. If the calculated P-value is greater than the threshold, however, the scanning engine 30 identifies (510) the event cluster as non-anomalous and the event cluster is not stored. In some implementations, the threshold value $P_T$ is pre-defined and stored in a data repository associated with the application server 10. In some cases, a user may enter, via a user device, new values for $P_T$. For example, the user can set $P_T$ equal to 0.4, 0.3, 0.2, 0.1 or 0.05. Other values of $P_T$ may be used as well.

In some cases, a user may be interested in the event clusters that demonstrate a substantially increased relative risk Q regardless of the statistical significance value P. As explained above, the relative risk Q represents the actual number of individualized data points located in a particular region S relative to a number of individualized data points expected to occur in that same region. For example, a filter can be applied to the event cluster having the maximum likelihood ratio, in which the cluster is identified as an anomaly when the relative risk Q is higher than some threshold value $Q_c$. In some implementations, the threshold value $Q_c$ is pre-defined and stored in a data repository associated with the application server 10. In some cases, a user may enter, via a user device, new values for $Q_c$. The anomalous event cluster then is stored in a data repository.

In some implementations, the relative risk Q can be a variable based on time instead of a constant. For example, the relative risk Q can represent the dynamics (e.g., increases, decreases or periodicity of event occurrences) of a time-varying event. The Q parameter can be modeled as a linear function of time, an exponential function of time, a logarithmic function of time, a sinusoidal function of time, among others. The particular model used to express Q can be user-defined or based on the historical dataset. Accordingly, in some cases, detection of an event cluster is more sensitive and can occur more rapidly given that the relative risk is more representative of event dynamics.

Depending on the size of the event clusters detected, the grid size can be adaptable. For example, the grid cell sizes may be re-adjusted to account for clusters that are too large or too small. Alternatively, or in addition, the size of the entire grid may be adjusted to account for very large or very small cluster sizes. In some cases, the process of detecting an anomalous cluster then is repeated for the new grid and/or cell size.

The foregoing approach of event cluster detection relies on a grid-based analysis, in which spatial and/or temporal regions are discretized into cells to which individualized data points are distributed. Each grid cell has a baseline value that is determined from a historical dataset unique to that cell. In some implementations, however, event cluster detection can be accomplished using a continuous distribution. In a continuous distribution the individualized data points may be distributed across a spatially and/or temporally homogeneous region, i.e., a region that has not been discretized. In this approach, the baseline is a uniform distribution across the entire region, such that event anomaly detection entails identifying absolute differences between clusters of individualized data points and the baseline distribution. A continuous distribution may be used to detect event clusters in locations that correspond to compact and dense regions in space and/or time. For example, such locations can include, but are not limited to, homes, offices, schools and hospitals.

Figure 6:
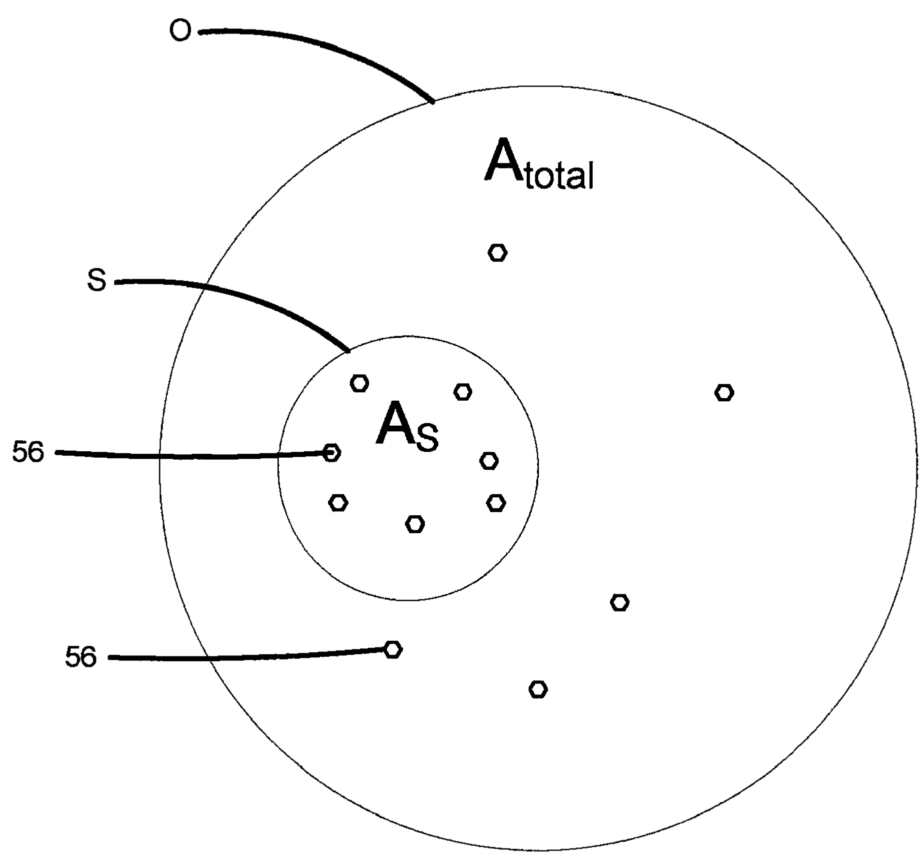
FIG. 6 shows an example of anomaly detection.

FIG. 6 shows an example of anomaly detection using a continuous-based approach. Assuming the received individualized data points 56 fall within an observation region O having a total observation area $A_{total}$, an event anomaly may be detected by locating a spatial and/or temporal region S that exhibits a significantly higher density of individualized data points than the surrounding area. Given that the baseline value of $A_{total}$ is homogeneous, the corresponding baseline value $b_s$ of region S is proportional to the area or region S, i.e., $b_s \propto A_s$. As with the grid-based approach, a likelihood ratio LR(S) then may be calculated for the region S using, for example, a Poisson distribution. The center of region S can be selected as any one of the individualized data points. Alternatively, the center of region S may be user-defined. Initially, the area or region S that is scanned should include at least two individualized data points. The region S may be expanded by including more data points from the total observation area as needed. The process can be repeated for each individualized data point in the observation region O. Subsequently, the region with the highest LR(S) is identified and significance testing is performed via randomization as in the grid-based approach.

When there are multiple clusters in a data set, the secondary clusters are either evaluated as if there were no other clusters in the data set or, optionally, adjusted for other clusters. For example, in an iterative process, the cluster with the maximum likelihood ratio, relative risk Q above a threshold $Q_c$, and a statistical significance P less than a threshold $P_T$, is stored in the data repository during each iteration. After the cluster is stored, it is removed from the dataset and the process is repeated, such that the cluster having the next highest likelihood ratio is examined for statistical significance and relative risk. The procedure can be repeated until there are no more clusters having a statistical significance P less than a pre-set maximum or until a fixed number of iterations have been completed. In some cases, the user can set the number of clusters that are reported or the number of iterations that run.

Once an anomalous event cluster has been identified and stored in a data repository, the application server 10 can export the recorded information to a display. The display may be associated with the server 10 or with one or more of the user devices. Other displays may be used as well. In some cases, the exported event clusters are displayed with relevant information, such as demographic information that indicates the demographics of the particular events identified within the cluster. Alternatively, or in addition, the exported event clusters are displayed with geographic information denoting the region in which the identified events occur. In some cases, the exported events are displayed with timing information that identifies when the events occurred. In certain implementations, the application determines the center of the anomalous event cluster which also can be displayed.

In some cases, the onset or conclusion of an event anomaly can be detected. In general, each temporal or space-time cluster is associated with a start time and an end time. The onset may be identified as the start time of the selected event cluster whereas the conclusion may be identified as the end time of the selected event cluster.

In some implementations, clusters of events may be detected which are conditional on the identification of a first cluster. These "second order clusters" can be used to identify "origins" and/or "destinations" of trips such as taxi rides, deliveries, traveling to and from social events, among others. That is to say, after detecting significant space-time clusters ("$1^{st}$ order") for data that can be labeled as an origin, a corresponding cluster of data ("$2^{nd}$ order") may be identified as a destination. The $2^{nd}$ order event cluster would contain individualized data points having the same unique identifier as at least a subset of the 1.sup.st order event cluster.

For example, multiple cabs arrive at region A and time X to pick up passengers. If the number of pickups in region A and/or at time X is significant, they can be identified as a $1^{st}$ order cluster according to the cluster detection analysis explained above. A subset of those cabs in the $1^{st}$ order cluster (which may be recognized based on their respective unique identifiers) may also make drop-offs in a region B at time Y (in which B is distinct from A and X is different from Y). If the number of drop-offs is significant, then the subset may be identified as a "$2^{nd}$ order cluster." If the destinations are randomly/widely distributed in space, however, no $2^{nd}$ order clusters will be found. The identification of the secondary cluster can use the same cluster detection analysis as used to identify the first order cluster. However, given that detection of the $2^{nd}$ order cluster entails a subset of the $1^{st}$ order cluster, processing time can be reduced. Each 2nd order cluster can correspond to exactly one 1st order cluster. Accordingly, a $1^{st}$ order-$2^{nd}$ order pair can be identified as a "flow cluster."

In some implementations, clusters also can be tracked. For example, after a spatial cluster has been identified and deemed statistically significant, movements of the cluster across a spatial region can be scanned periodically over time by applying a focused clustering test to that particular cluster. Focused clustering tests are described in Tango et al., "A Class of Tests for Detecting 'General' and 'Focused' Clustering of Rare Diseases," Statistics in Medicine 14, pgs. 2323-2334. Given that it is not necessary to re-scan the entire observational region when tracking clusters, higher statistical power can be achieved.

In some implementations, cluster detection also may be used to identify deviations from existing patterns. The existing patterns can include the steady or recurring flow of individuals or aggregate data. For example, a cluster may correspond to a pattern represented by an individual commuting every weekday morning from a train station to a downtown office. In another example, a cluster may correspond to aggregate data represented by the presence of significant automobile traffic between a first location (e.g., a marina) and a second location (e.g., a stadium) on a specified day every week. Once those patterns are recognized as clusters, deviations from those clusters can be identified. For example, if the commuter alters his path to the downtown office or if the traffic between the first and second location decreases, these deviations may be detected. Detecting cluster deviations occurs in the same manner as detecting cluster events, except that the cluster representative of the pattern is used as baseline data. The process of detecting deviations in clusters also can be adjusted based on covariates such as weather, time of day, day of week, among others.

Figure 7:
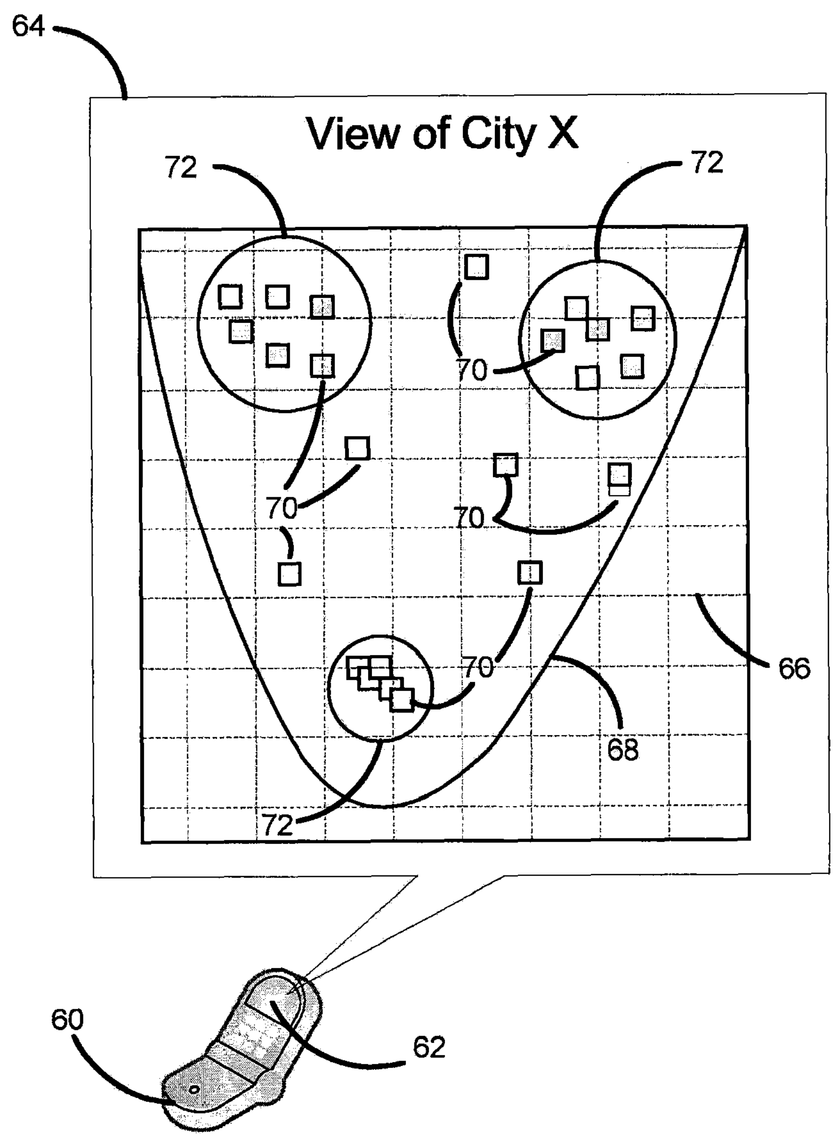
FIG. 7 shows an example of a display view on a mobile device.

FIG. 7 shows an example of a display view 64 on a mobile device 60. The mobile device 60 includes a display 62 on which the display view 64 shows the location of events 70 that occur across various locations of City X. As shown in the display view 64, a geographic region 68 of City X is overlaid with a grid 66. The events 70 correspond to individualized data points recorded from one or more user devices. In the example of FIG. 7, anomalous event clusters 72 are identified using circles that surround groups of individualized data points. Each cluster 72 denotes a region that has been identified as abnormal or anomalous event activity.

Figure 8:
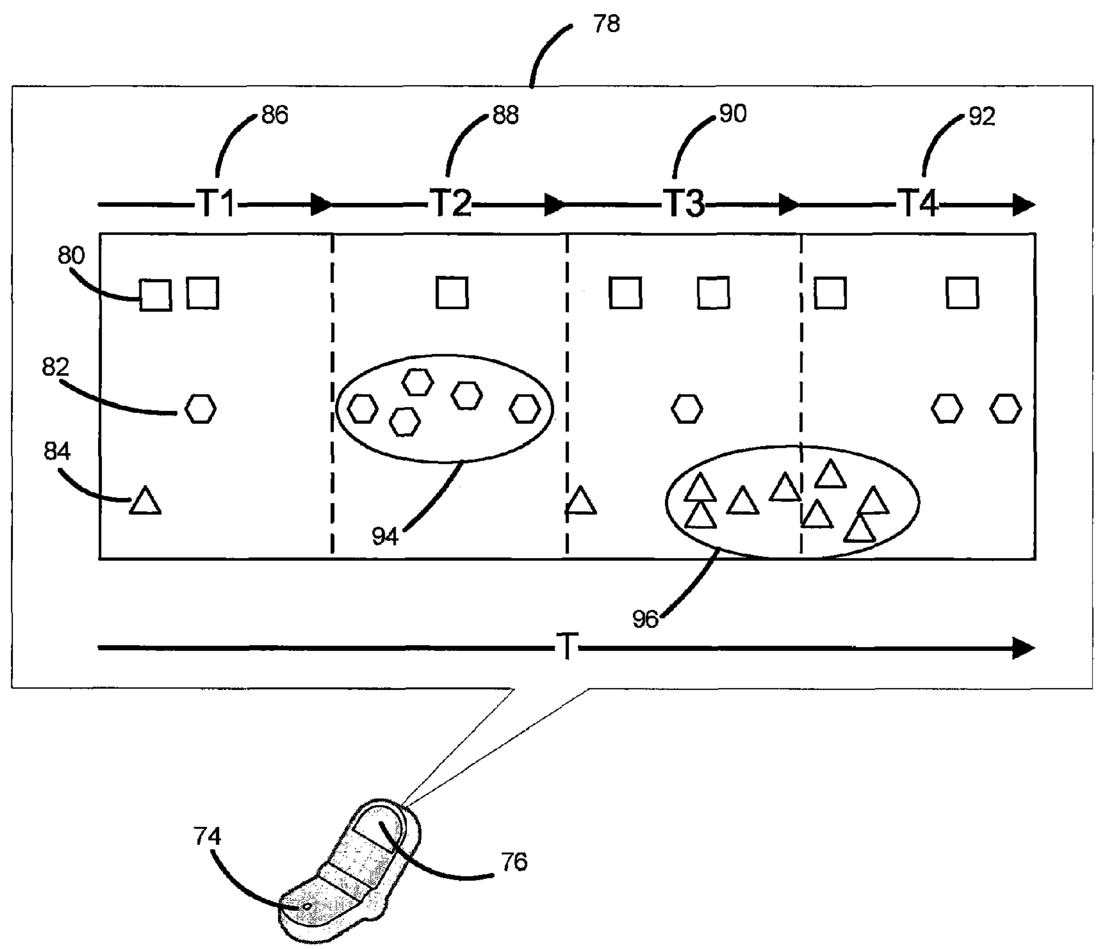
FIG. 8 shows an example of a display view on a mobile device.

FIG. 8 shows an example of a display view 78 on a mobile device 74. The mobile device 74 includes a display 76 on which the display view 78 shows the timing of a first event type 80, a second event type 82, and a third event type 84. The first, second and third event types each respectively represent the occurrence of a different type of individualized data point. For example, the first, second and third event types may represent the arrival of a person at three different respective locations in City X. The individualized data points are distributed across a time interval T, which is overlaid with a temporal grid having separate time periods 86, 88, 90 and 92. In the example of FIG. 8, anomalous event clusters are identified using circles 94 and 96. Cluster 94 denotes a time interval having abnormal or anomalous event activity of the second event type 82. In other words, cluster 94 signifies a time interval during which there is an anomalous increase in the number of persons arriving at a first particular location in City X. Cluster 96 denotes a time interval having abnormal or anomalous event activity of the second event type 84. In other words, cluster 96 signifies a time interval during which there is an anomalous increase in the number of persons arriving at a second different particular location in City X.

Figure 9:
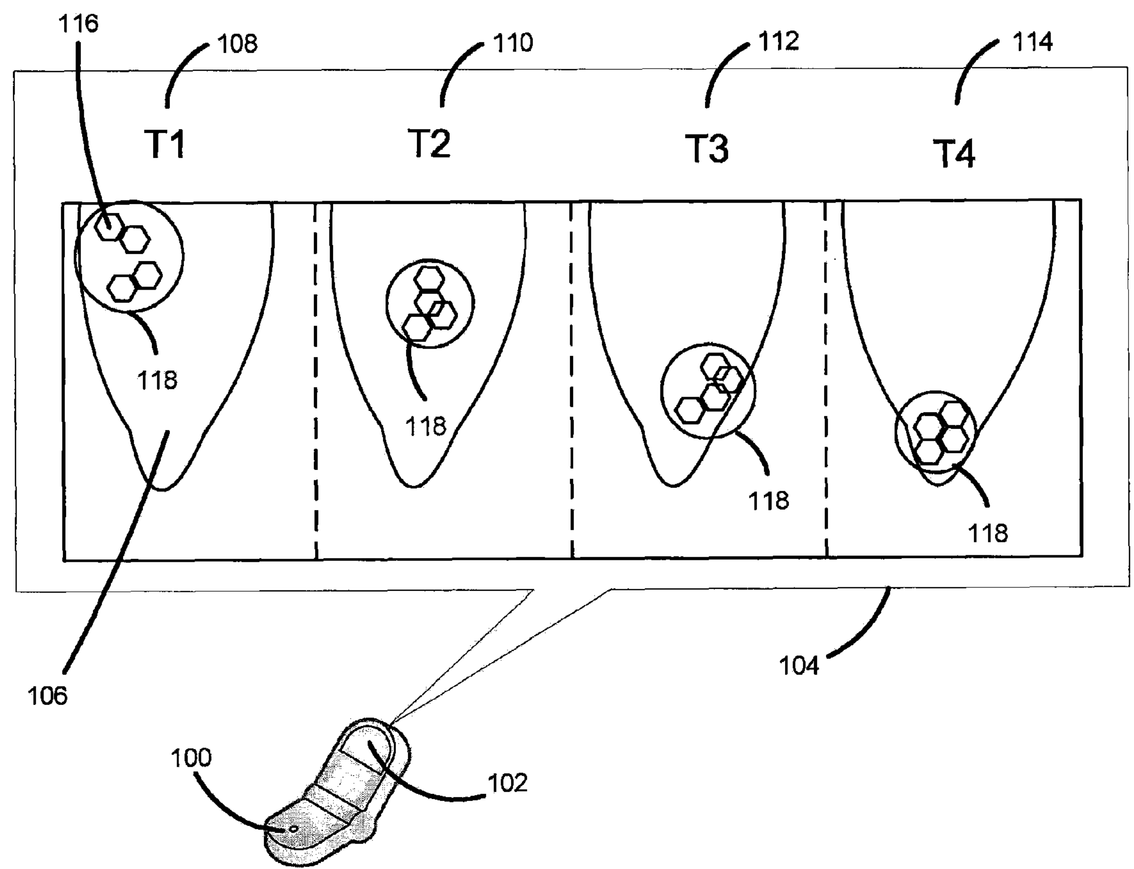
FIG. 9 shows an example of a display view on a mobile device.

FIG. 9 shows an example of a display view 104 on a mobile device 100. The mobile device 100 includes a display 102 on which the display view 104 shows a geographic region 106 captured at different time instances 108, 110, 112, 114. A location of one or more events 116 occurring in the geographic region 106 may be viewed at each time instance. In the example of FIG. 9, an anomalous event cluster may be identified using circle 118. As shown in the example, anomalous event clusters may be tracked over time and across geographic regions.

In some cases, additional display/reporting options can be selected when identifying anomalous event clusters. For example, a user can select to view secondary clusters only if they do not overlap with a previously displayed event cluster. In some implementations, clusters having a center overlapping another cluster can be excluded from being displayed. In some cases, clusters having a center that is centered in another cluster can be excluded from being displayed. In certain implementations, clusters having a center in a previously identified cluster are excluded from being displayed. In some cases, all clusters can be displayed with no restrictions. Accordingly, the most likely cluster will be displayed for each cell of the grid such that the number of clusters is equivalent to the number of grid cells.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method of detecting an event anomaly comprising:

receiving, by a data processing apparatus, one or more individualized data points, wherein each individualized data point represents a spatial or temporal event and has a unique identifier associated with it;

distributing, by the data processing apparatus, the one or more individualized data points across a grid, wherein the grid includes one or more cells;

determining, by the data processing apparatus, an event likelihood ratio for each of one or more of the grid cells, wherein determining the event likelihood ratio for a respective grid cell comprises determining an expected number of individualized data points in the respective grid cell;

identifying, by the data processing apparatus, one or more event clusters, based on the event likelihood ratio, wherein each event cluster includes one or more of the grid cells, thus defining a region on the grid;

generating, by the data processing apparatus, multiple replicas of the region;

performing, by the data processing apparatus, simulations on the multiple replicas to obtain a significance value for each of the one or more event clusters; and storing, by the data processing apparatus, the one or more event clusters in a data repository, based on a comparison of the significance value to a threshold.

2. The method according to claim 1, wherein the multiple replicas are generated based in part on a null hypothesis, and wherein the null hypothesis represents a baseline value determined from a historical dataset.

3. The method according to claim 1, wherein the multiple replicas are populated with random values obtained from a Poisson distribution or a negative binomial distribution with a mean and a variance from a historical data set.

4. The method according to claim 1, wherein the simulations performed on the multiple replicas are to enhance confidence that the one or more event clusters are anomalous.

5. The method according to claim 1, wherein the significance value corresponds to a ratio of the number of simulations that result in a maximum significance score that is greater than the event likelihood ratio relative to a total number of simulations performed by data processing apparatus.

6. The method according to claim 1, wherein the one or more data points are received according to a predetermined schedule.

7. The method according to claim 1, wherein the unique identifier comprises a location identifier.

8. The method according to claim 1, wherein the unique identifier comprises a time identifier.

9. The method according to claim 1, wherein the unique identifier comprises an event type identifier.

10. The method according to claim 1, wherein the unique identifier is associated with an individual user.

11. The method according to claim 1, wherein the unique identifier comprises a demographic attribute.

12. The method according to claim 11, wherein the demographic attribute is selected from the group consisting of Census Bureau data, financial demographics, social demographics, historical demographic information, derived demographic information, gender, race, educational level, historical geographic information and user entered information.

13. The method according to claim 1, wherein the grid is a spatial grid.

14. The method according to claim 13, further comprising partitioning the spatial grid based on a density of the individualized data points over a specified area.

15. The method according to claim 13, further comprising partitioning the spatial grid according to a predefined geographic layout.

16. The method according to claim 1, wherein the grid is a space-time grid.

17. The method according to claim 16, further comprising partitioning the space-time grid based on a frequency of occurrence of the individualized data points over a specified time interval.

18. The method according to claim 16, further comprising partitioning the space-time grid based on a density of individualized data points over a specified area.

19. The method according to claim 1, wherein the expected number of individualized data points is based on a time duration of historical events in the respective cell.

20. The method according to claim 1, wherein determining the expected number of individualized data points is based on an historical dataset in the respective cell.

21. The method according to claim 20, wherein determining the expected number of individualized data points comprises adjusting an historical dataset for the respective cell based on one or more covariate parameters.

22. The method according to claim 21, wherein the one or more covariate parameters comprises a weather event.

23. The method according to claim 21, wherein the one or more covariate parameters is selected from the group consisting of a holiday event, a time of the day, a time of the week, a time of the month, and a time of the year.

24. The method according to claim 1, wherein identifying one or more event clusters comprises calculating a total event likelihood ratio for one or more grid cells.

25. The method according to claim 1, wherein identifying one or more event clusters comprises scanning the grid for a group of one or more cells having a maximum event likelihood ratio.

26. The method according to claim 25, wherein the scanning is across a spatial region of the grid.

27. The method according to claim 25, wherein the scanning occurs over an interval in time.

28. The method according to claim 25, wherein the scanning occurs over an interval in space-time.

29. The method according to claim 1, further comprising exporting one or more identified event clusters to a display.

30. The method according to claim 29, wherein the one or more exported event clusters are non-overlapping.

31. The method according to claim 29, wherein an identified event cluster having a center in a previously exported event cluster is excluded from the display.

32. The method according to claim 29, wherein an identified event cluster having a center located in the center of a previously exported event cluster is excluded from the display.

33. The method according to claim 29, wherein an event cluster corresponding to each cell of the grid is exported to the display.

34. The method according to claim 1, further comprising refining a grid partition based on a size of one or more event clusters.

35. The method according to claim 1, further comprising annotating the event clusters with demographic information.

36. The method according to claim 1, wherein the threshold is user-defined.

37. The method according to claim 1, wherein the threshold is based on a size of the one or more event clusters.

38. The method according to claim 1, wherein the threshold is time dependent.

39. The method according to claim 1, further comprising determining a center of at least one of the one or more clusters having a relative risk greater than the specified threshold.

40. The method according to claim 1, further comprising identifying a flow cluster, wherein the flow cluster comprises a second order event cluster and a previously identified event cluster.

41. The method according to claim 40, wherein the second order event cluster is related to the previously identified event cluster based on individualized data points contained in the second order cluster and the previously identified cluster.

42. The method according to claim 41, wherein the individualized data points of the second order event cluster and a portion of the individualized data points of the previously identified cluster have the same unique identifier.

43. The method according to claim 1, further comprising tracking the one or more event clusters across a temporal and/or spatial region.

44. The method according to claim 1, further comprising detecting a deviation in the one or more event clusters.

45. A non-transitory computer readable medium having stored thereon a computer program that, when executed, causes a computer to perform the steps of:

receiving one or more individualized data points, wherein each individualized data point represents a spatial or temporal event and has a unique identifier associated with it;

distributing the one or more individualized data points across a grid, wherein the grid includes one or more cells;

determining an event likelihood ratio for each of one or more of the grid cells, wherein determining the event likelihood ratio for a respective grid cell comprises determining an expected number of individualized data points in the respective grid cell;

identifying one or more event clusters, based on the event likelihood ratio, wherein each event cluster includes one or more of the grid cells, thus defining a region on the grid;

generating multiple replicas of the region;

performing simulations on the multiple replicas to obtain a significance value for each of the one or more event clusters; and storing the one or more event clusters in a data repository, based on a comparison of the significance value to a threshold.

46. A system for detecting an event anomaly comprising:

a network;

one or more user devices in communication with the network; and a processor in communication with the network, wherein the processor is for:

i) receiving one or more individualized data points representing data originating from the one or more user devices, wherein each individualized data point represents a spatial or temporal event and has a unique identifier associated with it;

ii) distributing the one or more individualized data points across a grid, wherein the grid includes one or more cells;

iii) determining an event likelihood ratio for each of one or more of the grid cells, wherein determining the event likelihood ratio for a respective grid cell comprises determining an expected number of individualized data points in the respective grid cell;

iv) identifying one or more event clusters, based on the event likelihood ratio, wherein each event cluster includes one or more of the grid cells, thus defining a region on the grid;

v) generating multiple replicas of the region;

vi) performing simulations on the multiple replicas to obtain a significance value for each of the one or more event clusters; and vii) storing the one or more event clusters in a data repository, based on a comparison of the significance value to a specified threshold value.

47. A system comprising:

means for distributing one or more individualized data points across a grid, wherein the grid includes one or more cells;

means for detecting an event likelihood ratio for each of the one or more cells of the grid, wherein detecting the event likelihood ratio for a respective grid cell comprises determining an expected number of individualized data points in the one or more cells;

means for identifying one or more event cluster based on the event likelihood ratio, wherein each event cluster includes one or more of the grid cells, thus defining a region on the grid;

means for generating multiple replicas of the region;

means for performing simulations on the multiple replicas to obtain a significance value for each of the one or more event cluster; and means for storing the one or more event clusters in a data repository, based on a comparison of the significance value to a threshold.

48. A system comprising:

means for distributing one or more individualized data points across a grid, wherein the grid includes one or more cells;

means for detecting an event likelihood ratio for each of the one or more cells of the grid, wherein detecting the event likelihood ratio for a respective grid cell comprises determining an expected number of individualized data points in the one or more cells;

means for identifying one or more event cluster based on the event likelihood ratio, wherein each event cluster includes one or more of the grid cells, thus defining a region on the grid;

means for generating multiple replicas of the region;

means for performing simulations on the multiple replicas to obtain a significance value for each of the one or more event cluster, wherein the significance value corresponds to a ratio of the number of simulations that result in a maximum significance score that is greater than the event likelihood ratio relative to a total number of simulations performed; and means for storing the one or more event clusters in a data repository when the significance value is determined to be less than a threshold risk level.

* * * * *